United States Patent
Yamamoto

(10) Patent No.: US 8,041,392 B2
(45) Date of Patent: Oct. 18, 2011

(54) RADIO EQUIPMENT CONTROL, RADIO EQUIPMENT AND COMMUNICATION SYSTEM

(75) Inventor: Masaki Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 12/403,520

(22) Filed: Mar. 13, 2009

(65) Prior Publication Data
US 2009/0239477 A1 Sep. 24, 2009

(30) Foreign Application Priority Data
Mar. 19, 2008 (JP) ................................. 2008-072329

(51) Int. Cl.
*H04W 8/26* (2009.01)
*H04B 7/216* (2006.01)
*H04J 3/00* (2006.01)
(52) U.S. Cl. .................. 455/561; 370/335; 370/320
(58) Field of Classification Search ................ 455/561; 370/338, 339, 335, 320, 395.3
See application file for complete search history.

(56) References Cited

U.S. PATENT DOCUMENTS

| | | | |
|---|---|---|---|
| 7,529,215 B2 * | 5/2009 | Osterling | 370/338 |
| 7,646,751 B2 * | 1/2010 | Osterling et al. | 370/335 |
| 2005/0105534 A1 | 5/2005 | Osterling | |
| 2005/0105552 A1 | 5/2005 | Osterling | |
| 2005/0107124 A1 | 5/2005 | Osterling et al. | |
| 2011/0128950 A1 * | 6/2011 | Tomita et al. | 370/339 |

FOREIGN PATENT DOCUMENTS

JP 2007-511955 5/2007

OTHER PUBLICATIONS

"Common Public Radio Interface (CPRI); Interface Specification". CPRI Specification V3.0, Oct. 20, 2006, pp. 1-89, http://www.cpri.info/spec.htm.

* cited by examiner

*Primary Examiner* — Daniel D Chang
(74) *Attorney, Agent, or Firm* — Katten Muchin Rosenman LLP

(57) ABSTRACT

A radio equipment control for communicating plural radio equipment units including an identifier inserting unit for inserting into a frame an identifier for recognizing a connection relation of plural cascade-connected radio equipment units and a transmitting unit for transmitting the frame having the identifier inserted therein by the identifier inserting unit to the plural cascade-connected radio equipment units. The wireless communication apparatus includes a receiving unit for receiving the frame having the identifier inserted therein from the plural cascade-connected radio equipment units and a connection relation recognizing unit for recognizing the connection relation of the plural cascade-connected radio equipment units on the basis of the identifier of the frame received by the receiving unit.

15 Claims, 21 Drawing Sheets

FIG. 7

| SUBCHANNEL | OBJECT OF SUBCHANNEL | Xs=0 | Xs=1 | Xs=2 | Xs=3 |
|---|---|---|---|---|---|
| 0 | SYNCHRONIZATION AND TIMING | SYNCHRONOUS BYTE K28.5 | HFN | BFN-LOW | BFN-HIGH |
| 1 | SLOW C&M | SLOW C&M | SLOW C&M | SLOW C&M | SLOW C&M |
| 2 | L1 IN-BAND PROTOCOL | VERSION | START-UP | L1-RESET-LOS | POINTER p |
| 3 | RESERVED | RESERVED | RESERVED | RESERVED | RESERVED |
| ... | ... | ... | ... | ... | ... |
| 15 | RESERVED | RESERVED | RESERVED | RESERVED | RESERVED |
| 16 | VENDOR SPECIFIC | VENDOR SPECIFIC | VENDOR SPECIFIC | VENDOR SPECIFIC | VENDOR SPECIFIC |
| ... | ... | ... | ... | ... | ... |
| p−1 | VENDOR SPECIFIC | VENDOR SPECIFIC | VENDOR SPECIFIC | VENDOR SPECIFIC | VENDOR SPECIFIC |
| POINTER : p | FAST C&M | FAST C&M | FAST C&M | FAST C&M | FAST C&M |
| ... | ... | ... | ... | ... | ... |
| 63 | FAST C&M | FAST C&M | FAST C&M | FAST C&M | FAST C&M |

Areas (columns Xs=0..3):
- SYNC COMMUNICATION AREA (subchannel 0)
- HDLC COMMUNICATION AREA (subchannel 1)
- L1 IN-BAND PROTOCOL COMMUNICATION AREA (subchannel 2)
- VENDOR SPECIFIC COMMUNICATION AREA (subchannels 16 to p−1)
- ETHERNET COMMUNICATION AREA (subchannels p to 63)

FIG. 10

| SUBCHANNEL | OBJECT OF SUBCHANNEL | Xs=0 (8bits) | Xs=1 (8bits) | Xs=2 (8bits) | Xs=3 (8bits) |
|---|---|---|---|---|---|
| 16 | VENDOR SPECIFIC | RE IDENTIFIER | Unused | Unused | Unused |

FIG. 11

| SUBCHANNEL | OBJECT OF SUBCHANNEL | Xs=0 (8bits) | Xs=1 (8bits) | Xs=2 (8bits) | Xs=3 (8bits) |
|---|---|---|---|---|---|
| 17 | VENDOR SPECIFIC | | AREA FOR RE51 | | |
| 18 | VENDOR SPECIFIC | | AREA FOR RE52 | | |
| 19 | VENDOR SPECIFIC | | AREA FOR RE53 | | |
| 20 | VENDOR SPECIFIC | | AREA FOR RE54 | | |
| 21 | VENDOR SPECIFIC | | AREA FOR RE55 | | |
| 22 | VENDOR SPECIFIC | | AREA FOR RE56 | | |
| 23 | VENDOR SPECIFIC | | AREA FOR RE57 | | |
| 24 | VENDOR SPECIFIC | | AREA FOR RE58 | | |

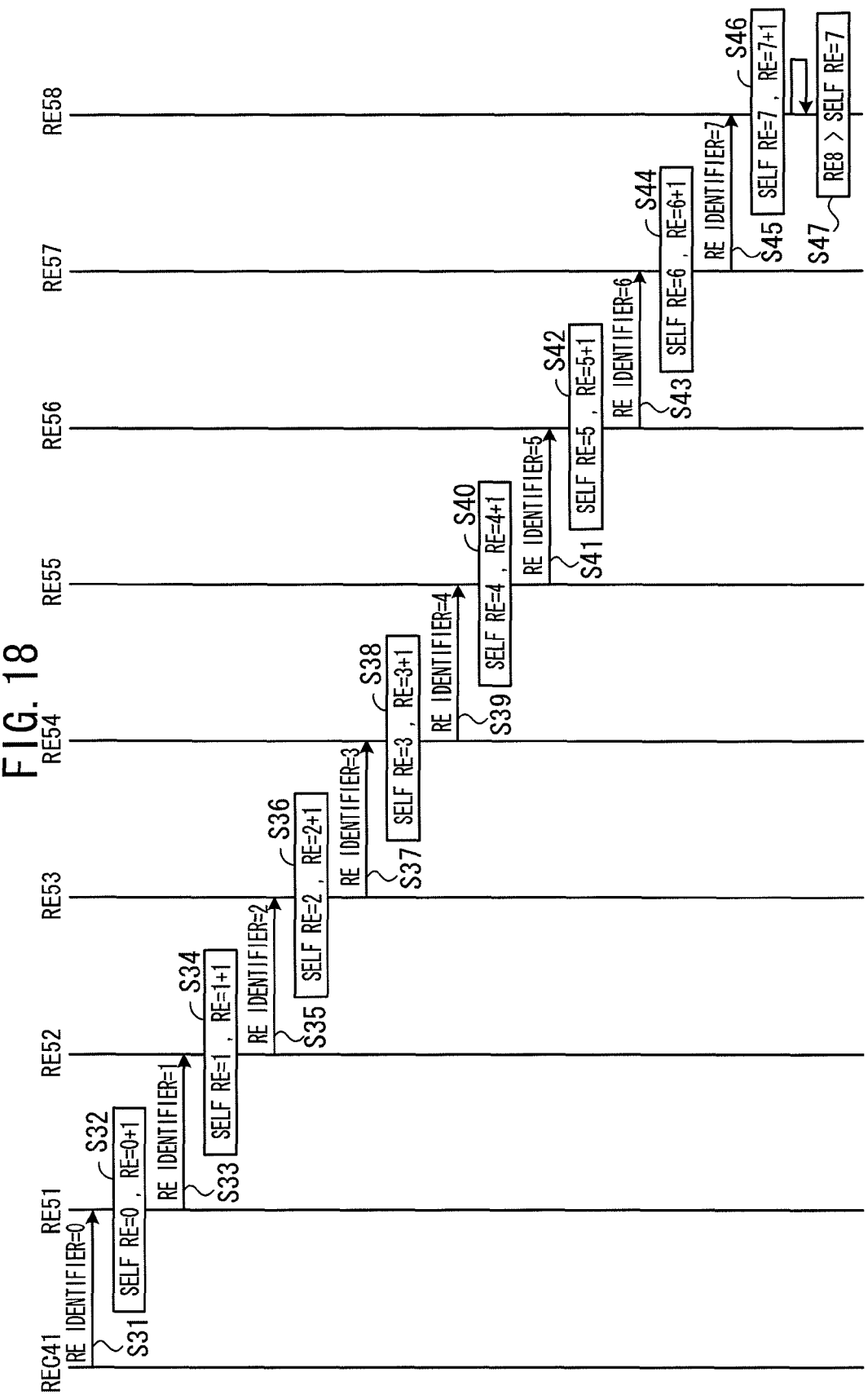

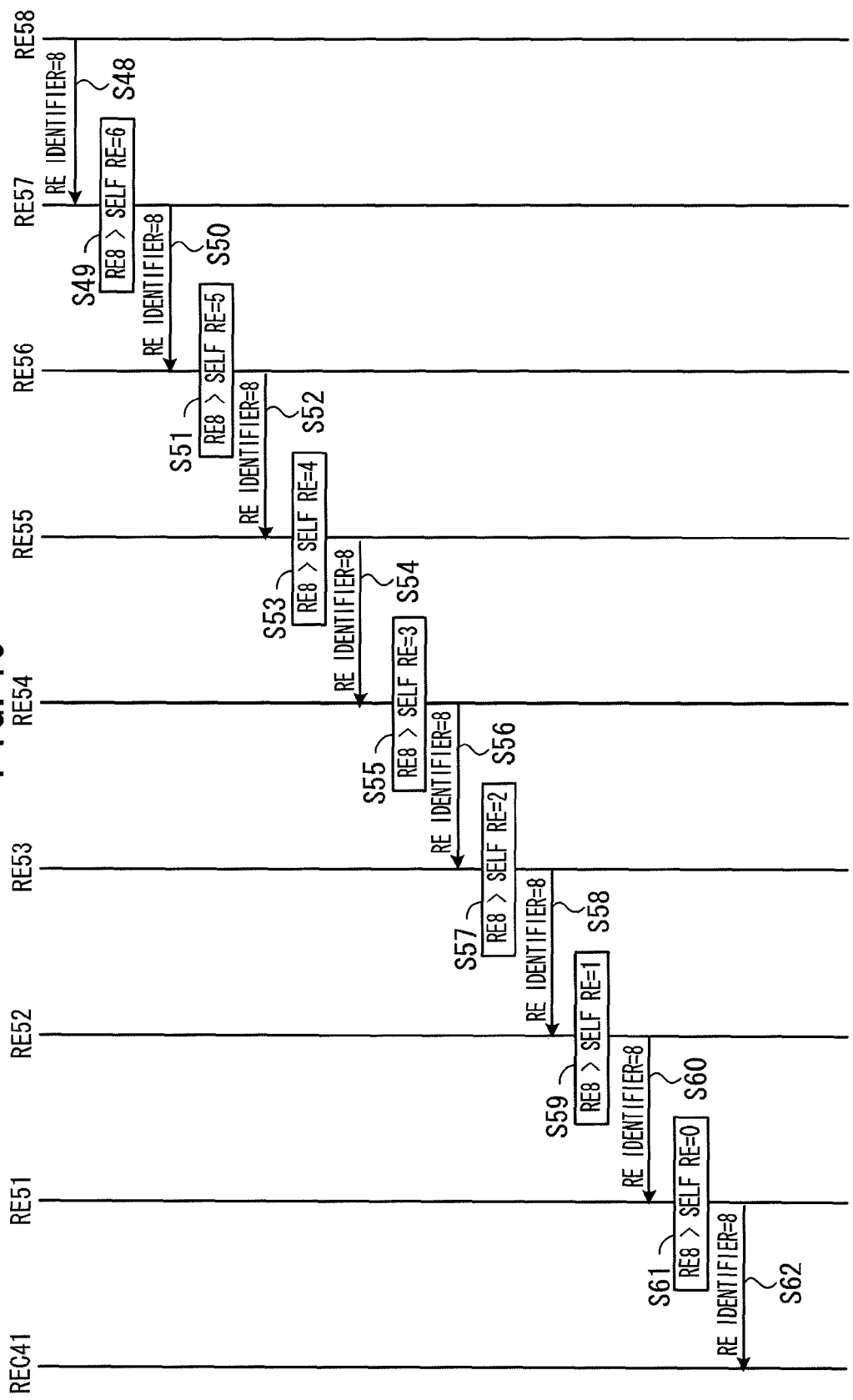

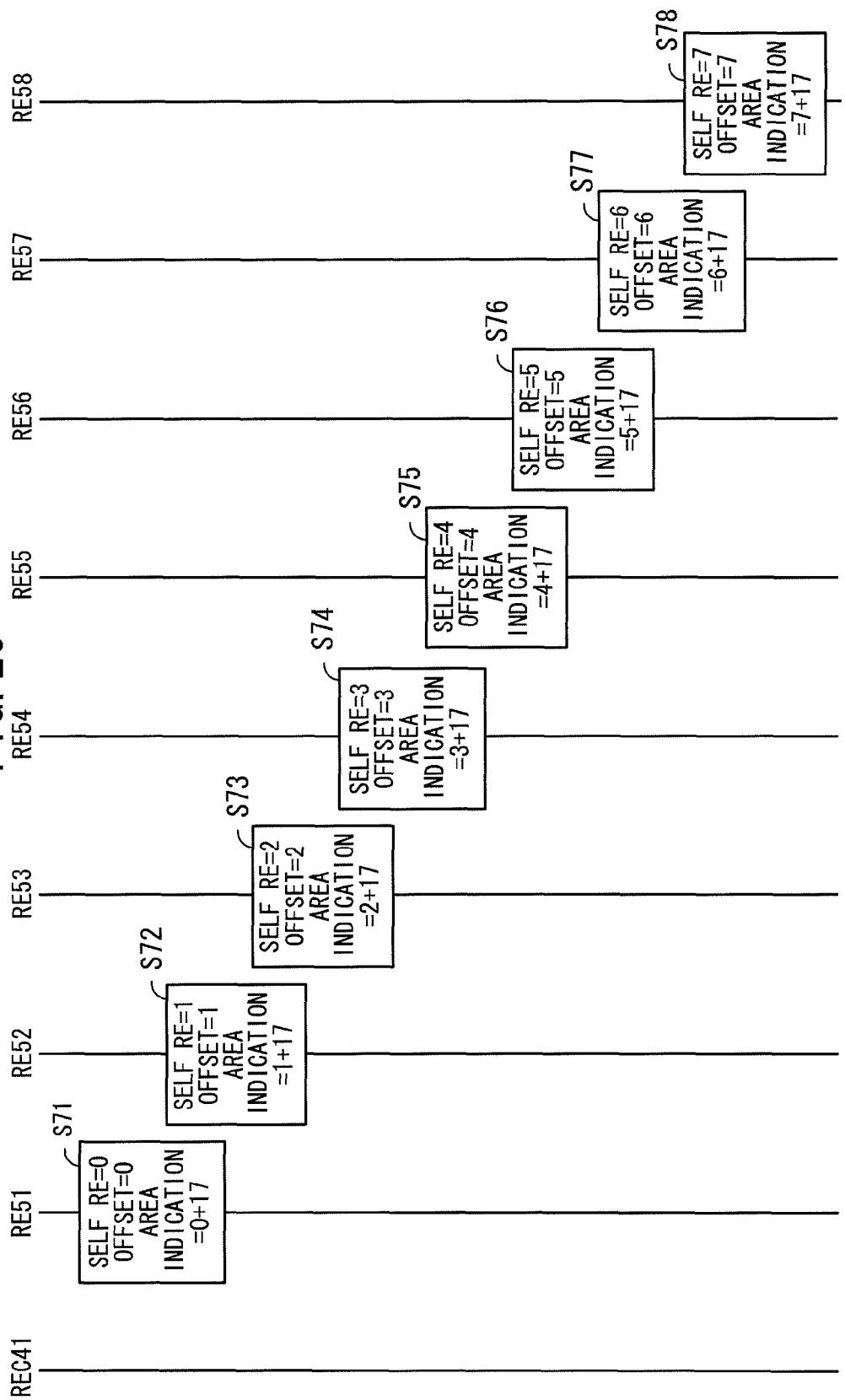

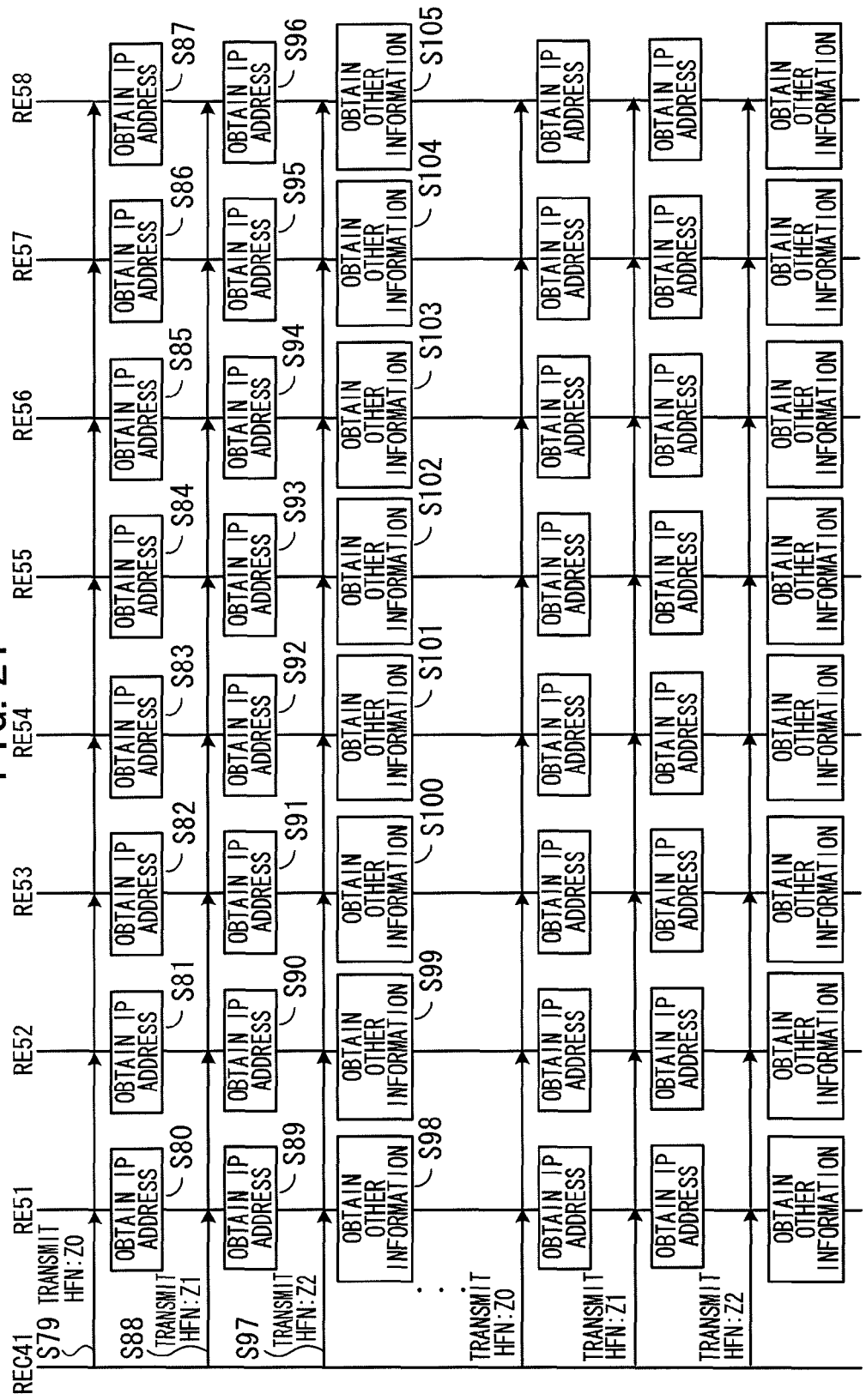

US 8,041,392 B2

RADIO EQUIPMENT CONTROL, RADIO EQUIPMENT AND COMMUNICATION SYSTEM

CROSS-REFERENCE TO RELATED APPLICATION(S)

This application is based upon and claims the benefit of priority of the prior Japanese Patent Application No. 2008-72329, filed Mar. 19, 2008, the entire contents of which are incorporated herein by reference.

BACKGROUND

1. Field

The present invention relates to a radio equipment control, radio equipment and a communication system to perform communications in a base station.

2. Description of the Related Art

A base station in a radio communication system that includes cellular phones or the like may be divided into RE (Radio Equipment), which processes radio signals, and REC (Radio Equipment Control), which controls the REs (RE units). For example, CPRI (Common Public Radio Interface) is known as an interface for connecting REC and REs. By using CPRI, the base station can be divided into REs and REC, and setting the interface is made open to users, whereby respective sections in the base station can be multivendored. CPRI defines layer1 (L1) and layer2 (L2) based on hardware as an application range.

There has been known a connecting arrangement between REC and REs in which REC has plural CPRIs and each CPRI is connected to RE in one-to-one style. Furthermore, there is known a connecting arrangement in which REs are cascade-connected (for example, refer to paragraph 0046 and FIG. 11 of Japanese translation of PCT international application No. 2007-511955). In the cascade connection of REs, REC and RE at the first stage are connected to each other through CPRI, and RE and RE at subsequent stages are connected to each other through a connection unit inherent to the device.

SUMMARY

However, in order to perform communications between REC and RE in the conventional cascade connection, it is desired to be recognized in advance how REs are cascade-connected, that is, the connection relations of REs. Therefore, it is difficult to newly add and delete any radio equipment to and from the cascade connection.

According to an aspect of the embodiments, a radio equipment control for communicating plural radio equipment units including an identifier inserting unit for inserting into a frame an identifier for recognizing a connection relation of the plural cascade-connected radio equipment units and a transmitting unit for transmitting the frame having the identifier inserted therein by the identifier inserting unit to the plural cascade-connected radio equipment units. The wireless communication apparatus includes a receiving unit for receiving the frame having the identifier inserted therein from the plural cascade-connected radio equipment units and a connection relation recognizing unit for recognizing the connection relation of the plural cascade-connected radio equipment units on the basis of the identifier of the frame received by the receiving unit.

The object and advantages of the embodiments will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF THE DRAWINGS

FIG. 7 is a diagram illustrating control word mapping;

FIG. 10 is a diagram illustrating mapping of an RE identifier;

FIG. 11 is a diagram illustrating mapping of communication information;

FIG. 18 is a sequence diagram illustrating the recognition processing of REC-RE;

FIG. 19 is a sequence diagram illustrating recognition processing of REC-RE;

FIG. 20 is a sequence diagram of the communication information processing of REC-RE; and FIG. 21 is a sequence diagram of the communication information processing of REC-RE.

DESCRIPTION OF EMBODIMENTS

Figure 1:
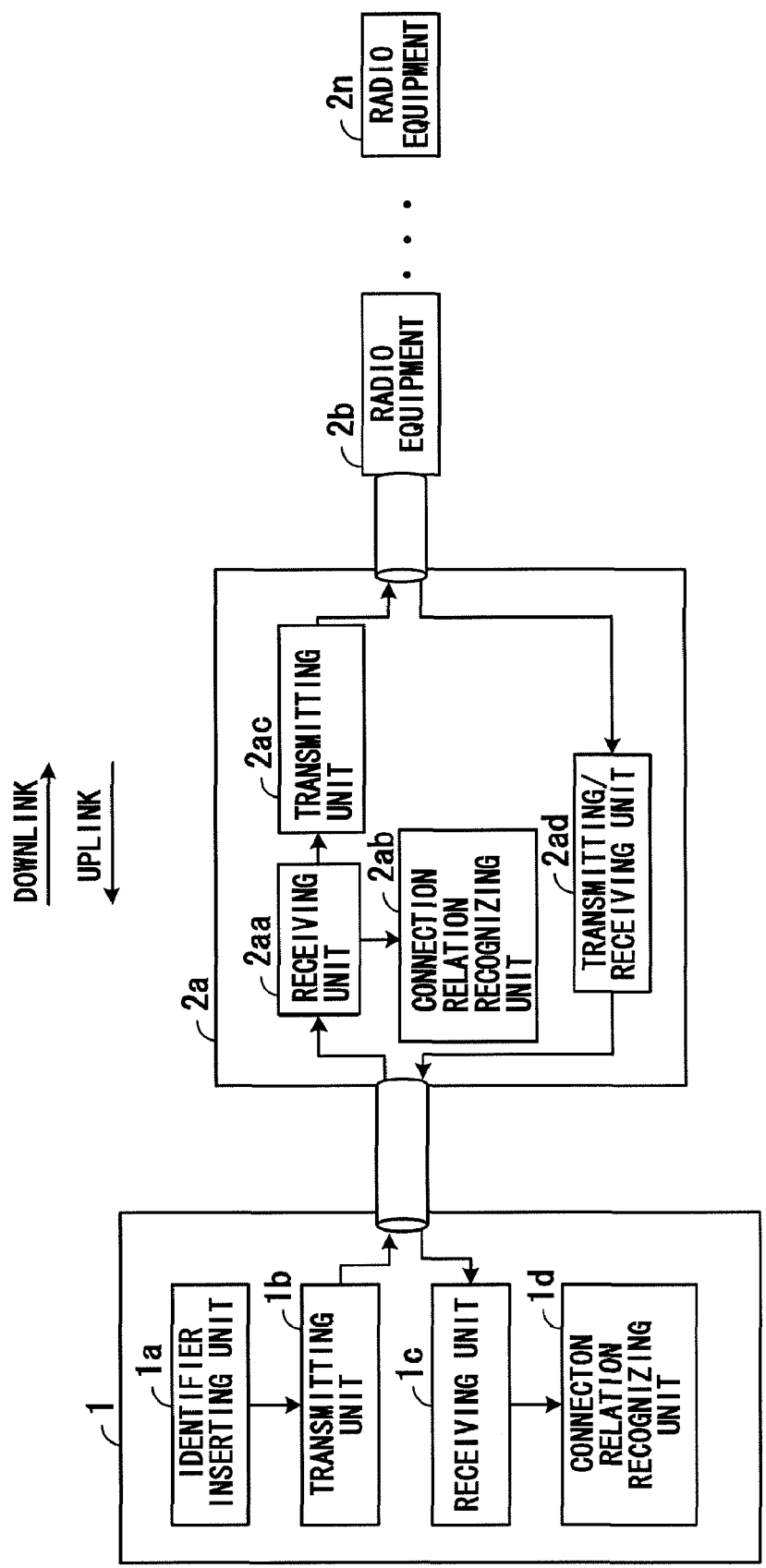
FIG. 1 is a diagram illustrating a radio equipment control and radio equipment units.

FIG. 1 is a diagram illustrating a radio equipment control and radio equipment units. A radio equipment control 1 and radio equipment units 2a, 2b, . . . , 2n illustrated in FIG. 1 are contained in a base station for wirelessly communicating with mobile terminals, such as cellular phones or the like.

The radio equipment control 1 and the radio equipment 2a, 2b, . . . , 2n are respectively adapted to recognize the cascade connection relation of the respective elements, and thus communicate with one another even when radio equipment is newly added to or deleted from the cascade connection of the radio equipment units 2a, 2b, . . . , 2n.

The radio equipment control 1 has an identifier inserting unit 1a, a transmitting unit 1b, a receiving unit 1c and a connection relation recognizing unit 1d. The radio equipment 2a has a receiving unit 2aa, a connection relation recognizing unit 2ab, a transmitting unit 2ac and a transmitting/receiving unit 2ad. The radio equipment units 2b, . . . , 2n each have the same units as the radio equipment 2a. The radio equipment 2a, 2b, . . . , 2n is cascade-connected, and the radio equipment 2a is connected to the radio equipment control 1. The direction from the radio equipment control 1 to the radio equipment 2n is called "downlink" and the direction from the radio equipment 2n to the radio equipment control 1 is called "uplink."

The identifier inserting unit 1a of the radio equipment control 1 inserts, into a frame, an identifier for recognizing the connection relation of the plural cascade-connected radio equipment units 2a, 2b, . . . , 2n.

The transmitting unit 1b transmits to the cascade-connected radio equipment 2a the frame in which the identifier is inserted by the identifier inserting unit 1a.

The receiving unit 1c receives the frame having the identifier inserted therein from the cascade-connected radio equipment 2a.

The connection relation recognizing unit 1d recognizes the connection relation of the plural cascade-connected radio equipment units 2a, 2b, . . . , 2n on the basis of the identifier of the frame received by the receiving unit 1c. For example, on the basis of the identifier of the received frame, the connection relation recognizing unit 1d recognizes how many radio equipment units 2a, 2b, . . . , 2n are cascade-connected.

The receiving unit 2aa of the radio equipment 2a receives a frame having an identifier inserted therein from the radio equipment control 1.

On the basis of the identifier of the frame received by the receiving unit 2aa, the connection relation recognizing unit 2ab recognizes the connection relation of the radio equipment 2a in the radio equipment group including the plural cascade-connected radio equipment units 2a, 2b, . . . , 2n. For example, on the basis of the identifier of the received frame, the connection relation recognizing unit 2ab recognizes at which stage of the group of the plural cascade-connected radio equipment units 2a, 2b, . . . , 2n the radio equipment 2a is cascade-connected.

The transmitting unit 2ac executes a predetermined operation on the frame received by the receiving unit 2aa, and transmits the frame concerned to the downlink radio equipment 2b cascade-connected to the radio equipment 2a. For example, the transmitting unit 2ac adds "1" to the identifier, and then transmits the frame to the downlink radio equipment 2b.

The transmitting/receiving unit 2ad receives an uplink frame from another downlink radio equipment 2b and transmits the frame concerned to the radio equipment control 1.

The operation in FIG. 1 will be described hereunder. The identifier inserting unit 1a of the radio equipment control 1 inserts an identifier into a frame. For example, it inserts an identifier of "0" into the frame. The transmitting unit 1b transmits the frame having the identifier "0" inserted to the radio equipment 2a.

The receiving unit 2aa of the radio equipment 2a receives the frame from the radio equipment control 1. On the basis of the identifier "0" of the received frame, the connection relation recognizing unit 2ab can recognize that the radio equipment 2a is located at the first stage of the cascade connection of the plural cascade-connected radio equipment units 2a, 2b, . . . , 2n and connected to the radio equipment control 1.

The transmitting unit 2ac adds "1" to the identifier of the frame received by the receiving unit 2aa, and transmits the frame concerned to the downlink radio equipment 2b. That is, the transmitting unit 2ac transmits the identifier "1" to the radio equipment 2b.

The radio equipment 2b has the same units as the radio equipment 2a, and thus on the basis of the identifier "1" of the received frame, the radio equipment 2b can recognize that the radio equipment 2b is located at the second stage of the cascade connection of the plural cascade-connected radio equipment units 2a, 2b, . . . , 2n.

As in the case of the radio equipment 2a, the radio equipment 2b adds "1" to the identifier of the received frame, and transmits the frame having the identifier "2" to the downlink radio equipment. Accordingly, the radio equipment connected in the downlink of the radio equipment 2b receives the identifier "2", and thus can recognize that it is located at the third stage of the cascade connection of the plural cascade-connected radio equipment units 2a, 2b, . . . , 2n.

Likewise, the radio equipment 2n can recognize that it is located at the n-th stage of the cascade connection of the plural cascade-connected radio equipment units 2a, 2b, . . . , 2n. The radio equipment 2n is located at the last stage, and thus it adds "1" to the identifier and transmits the frame having the identifier "n" to the uplink radio equipment.

Each of the plural cascade-connected radio equipment units 2b, . . . , 2n has the same transmitting/receiving unit as the one 2ad of the radio equipment 2a, and thus transmits the uplink frame having the identifier "n" to the radio equipment connected in the uplink.

The transmitting/receiving unit 2ad of the radio equipment 2a receives the frame of the identifier "n" from the radio equipment 2b, and transmits the received uplink frame having the identifier "n" to the radio equipment control 1.

The receiving unit 1c of the radio equipment control 1 receives the frame having the identifier "n" from the radio equipment 2a. The connection relation recognizing unit 1d can recognize on the basis of the identifier "n" of the frame received by the receiving unit 1c that the n radio equipment units 2a, 2b, . . . , 2n are cascade-connected.

As described above, the radio equipment control 1 and the radio equipment units 2a, 2b, . . . , 2n can recognize the connection relation of the cascade connection of the radio equipment units 2a, 2b, . . . , 2n by transmitting/receiving the identifier, and can newly add and delete radio equipment to and from the cascade connection of the radio equipment units 2a, 2b, . . . , 2n with ease.

Next, this embodiment will be described in detail with reference to the accompanying drawings.

Figure 2:
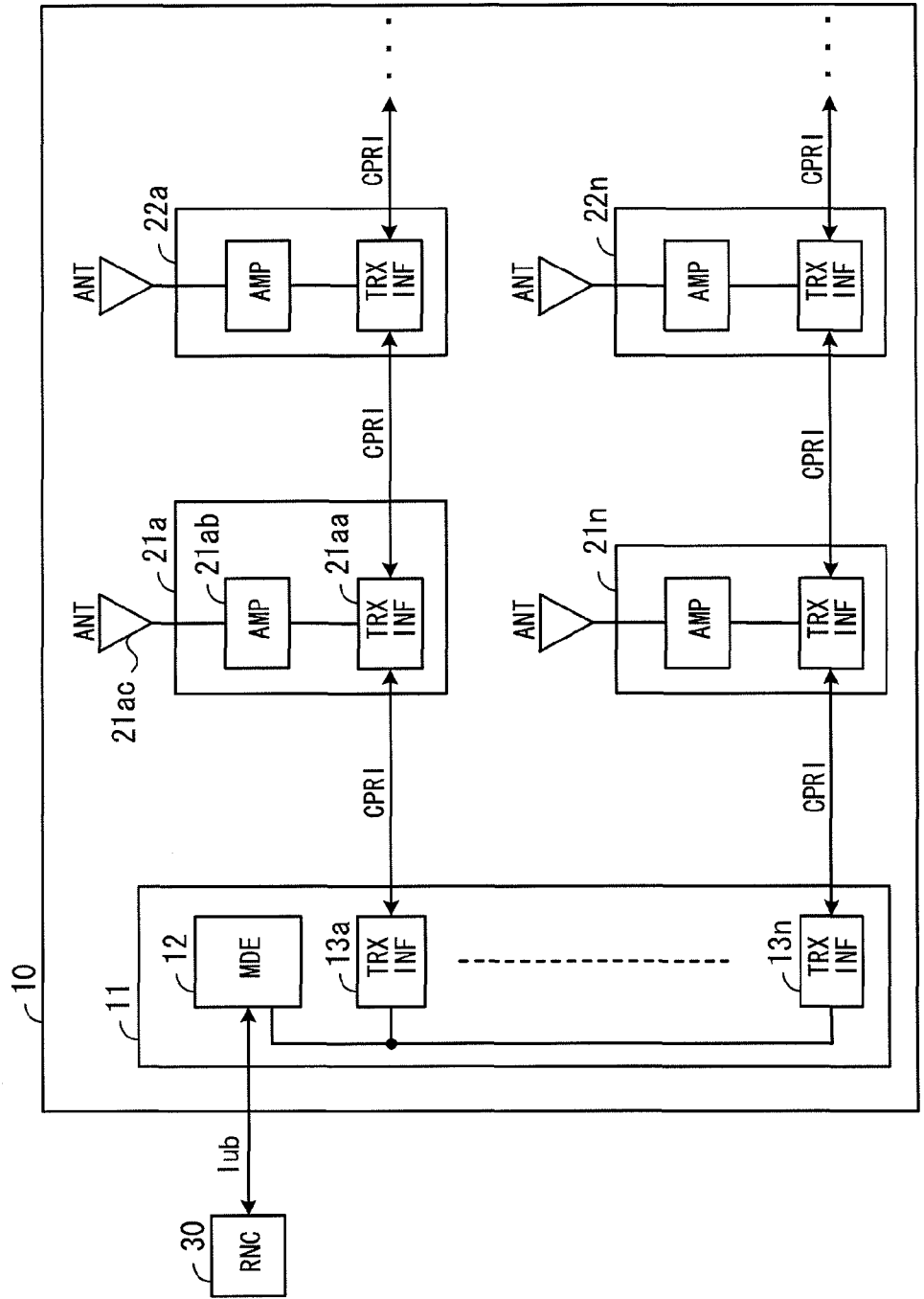
FIG. 2 is a block diagram illustrating the construction of a base station in which REs are cascade-connected.

FIG. 2 is a block diagram illustrating a base station containing cascade-connected RE. In FIG. 2, a base station 10 and RNC (Radio Network controller) 30 are illustrated. The base station 10 and RNC 30 are connected to each other by Iub (Interface between RNC and UMTS (Universal Mobile Telecommunication Systems) radio base station (Node B)). RNC 30 is a superordinate device for controlling the base station 10. The base station 10 performs radio communications with mobile terminals, such as cellular phones or the like.

The base station 10 has REC 11 and RE 21a to 21n and RE 22a to 22n, etc. REs 21a to 21n are connected to REC 11, and REs 22a to 22n are cascade-connected to REs 21a to 21n. REC 11, REs 21a to 21n, REs 22a to 22n, etc. are connected to one another by respective CPRIs.

REC 11 has MDE (Modulation and demodulation Equipment) 12 and TRXINF (Transmitter and Receiver InterFace) 13a to 13n. MDE 12 decodes/modulates data to be communicated with RNC 30. MDE 12 demodulates/modulates data to be communicated with RE 21a to 21n, REs 22a to 22n. TRXINFs 13a to 13n are interfaces for performing communications based on CPRI with REs 21a to 21n.

RE 21a has TRXINF 21aa and AMP 21ab. TRXINF 21aa is an interface for performing communication based on CPRI with REC 11 and REs 22a to 22n. AMP (AMPlifier) 21ab is an amplifier, and it amplifies data received by TRXINF 21aa and outputs the amplified data to ANT (ANTenna) 21ac.

AMP 21ab amplifies the data received from ANT 21ac, and outputs the amplified the data to TRXINF 21aa. The other REs each have the same construction as RE 21a, and the description thereof is omitted.

REC 11 and REs 21a to 21n, REs 22a to 22n (hereinafter REs 22a to 22n may be simply referred as REs) recognize the connection relation of the cascade connection. For example, REC 11 and REs can recognize how many REs are cascade-connected and also at which stage of the cascade connection each RE unit is cascade-connected. This recognition is executed periodically at an interval of several seconds.

When recognizing the connection relation of the REs' cascade connection, REC 11 transmits communication information such as IP (Internet Protocol) address or the like to individual REs so that Ethernet (registered trademark) communication or HDLC (High-level Data Link Control) communication, which is supported by CPRIs, between REC 11 and REs can be performed. REC 11 and REs can transmit/receive data on the basis of the communication information.

As described above, REC 11 and REs execute the recognition processing of the cascade connection periodically, whereby RE can be added/deleted to/from the cascade connection, and thus the connection relation of the cascade connection can be easily changed.

Furthermore, REC 11 and REs which are cascade-connected communicate with each other on the basis of CPRI without using any special link, and thus general versatility can be maintained even when REs are cascade-connected.

Figure 3:
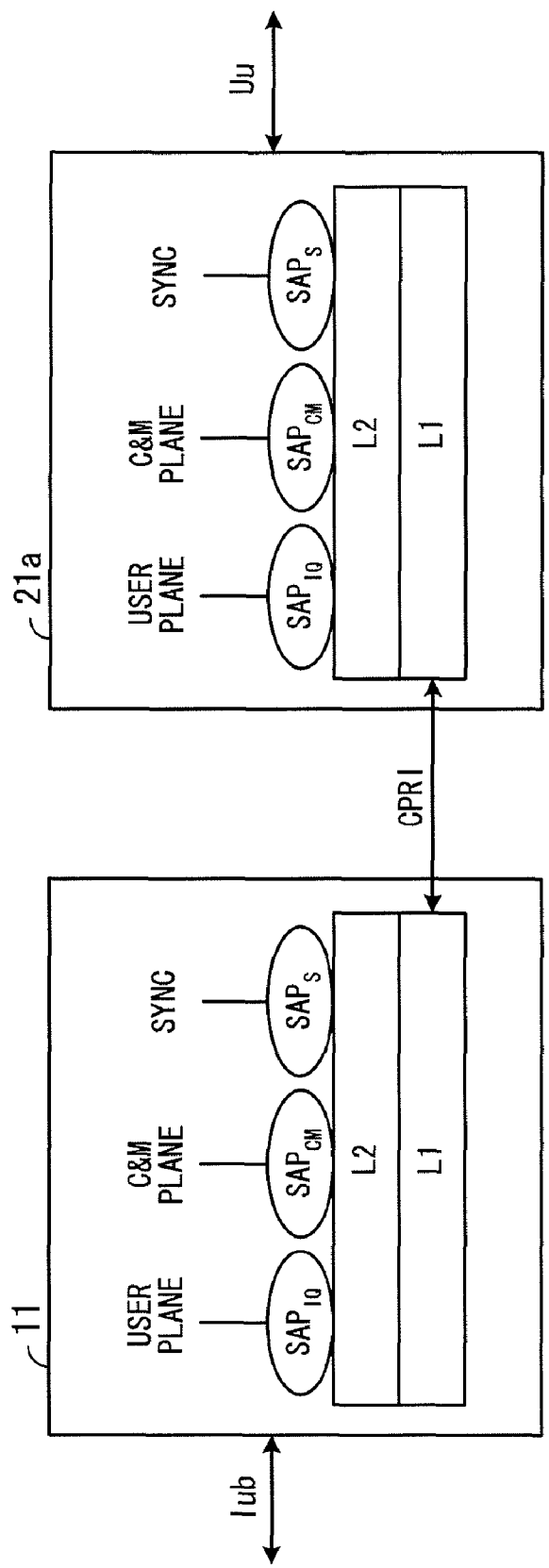
FIG. 3 is a diagram illustrating CPRI communication.

FIG. 3 is a diagram explaining CPRI communication. REC 11 and RE 21a of FIG. 2 are illustrated in FIG. 3. CPRI defines the protocol of the layers L1 and L2 of data transmitted/received between REC 11 and REs.

The data to be transmitted/received between REC 11 and REs contain user plane (U-Plane), C&M (Control & Management) plane and SYNC (SYNChronization). The user plane is user data to be transmitted/received between mobile terminals, for example. The C&M plane is data for controlling and managing REC 11 and REs. SYNC is synchronous information for establishing synchronization between REC 11 and REs.

The user plane is transmitted/received to/from the layer2 (L2) through a service access point $SAP_{IQ}$. The C&M plane is transmitted/received to/from the layer2 (L2) through a service access point $SAP_{CM}$. SYNC is transmitted/received to/from the layer2 (L2) through a service access point $SAP_S$. Uu (UMTS air interface) illustrated in FIG. 3 represents an air interface of UMTS.

Figure 4:
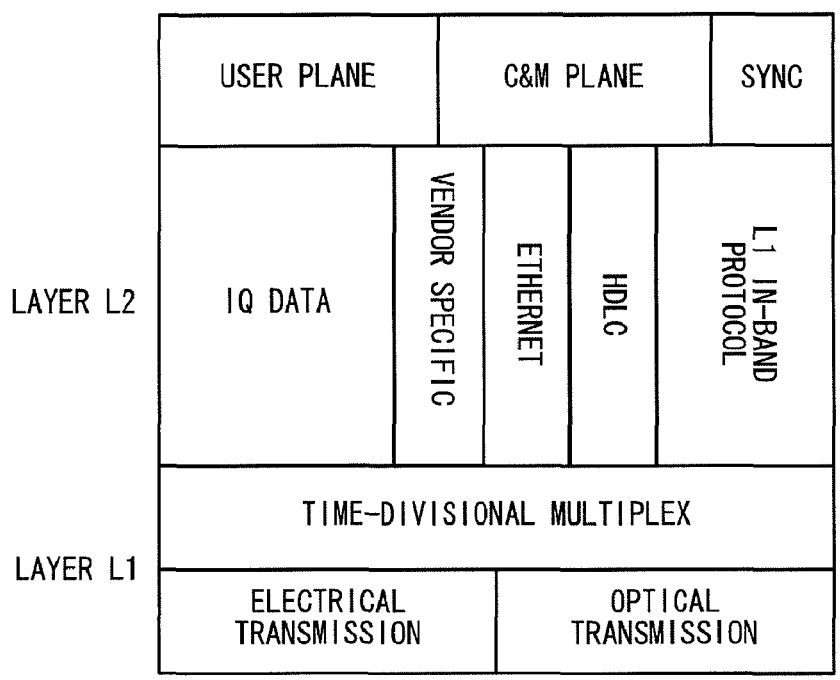
FIG. 4 is a diagram illustrating the protocol construction of CPRI.

FIG. 4 is a diagram illustrating the protocol construction of CPRI. As illustrated in FIG. 4, the user plane is transmitted/received through an IQ (In-phase Quadrature) data area or a vendor specific area. The vendor specific area is a protocol used to transmit vendor specific information, and it can be freely used by a user.

The C&M plane is transmitted/received through the vendor specific area, an Ethernet area, an HDLC (High-level Data Link Control) area, and an L1 in-band protocol area. The fast C&M plane is transmitted/received in the Ethernet format, and the low-speed C&M plane is transmitted/received in the HDLC format. The L1 in-band protocol is a link-related protocol used on the physical layer, and it is used to perform processing relevant to the layer L1 at the system start-up time or the like.

SYNC is transmitted/received through the L1 in-band protocol area.

The data of the IQ data area, the vendor specific area, the Ethernet area, the HDLC area and the L1 in-band protocol area are time-divisionally multiplexed by the layer L1, and the time-divisionally multiplexed data is transmitted/received electrically or optically.

Figure 5:
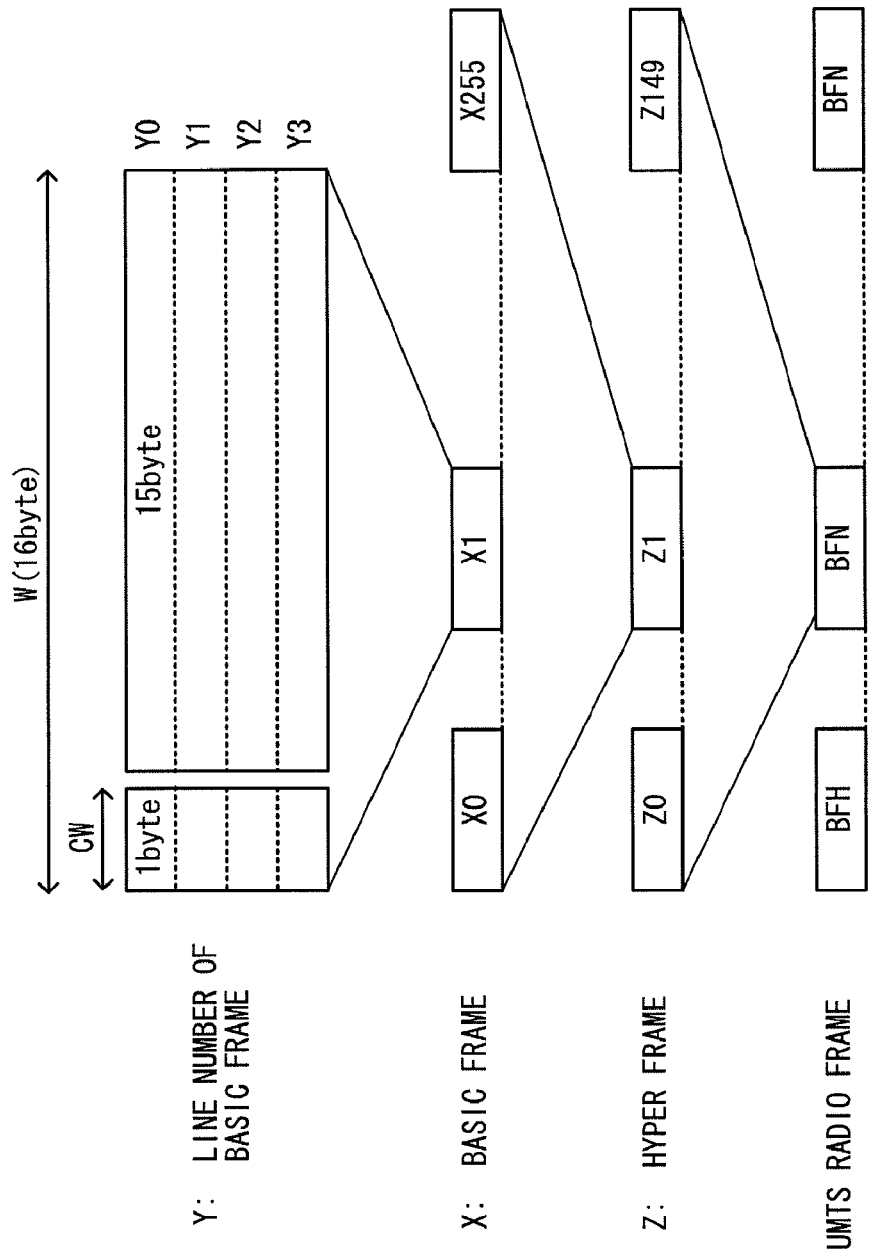
FIG. 5 is a diagram illustrating an example of the frame construction of CPRI.

FIG. 5 is a diagram illustrating an example of the frame construction of CPRI. The frame of CPRI has a hierarchical structure containing a basic frame, a hyper frame and an UMTS radio frame as illustrated in FIG. 5. An assembly of 256 basic frames serves as a hyper frame, and an assembly of 150 hyper frames serves as an UMTS radio frame.

Indexes X0 to X255 are allocated to the basic frames, and indexes Z0 to Z149 are allocated to the hyper frames. Furthermore, Y0 to Y3 are allocated as line numbers to the basic frames. It can be indicated on the basis of Z, X, Y (Z, X, Y: positive integers) where the basic frames are disposed in the UMTS radio frame.

As illustrated in FIG. 5, the basic frame is managed by the values of Y0 to Y3 while 16 bytes are set as one unit. 1 byte at the head of the basic frame is defined as a control word (CW). IQ data is stored in the remaining 15 bytes of the basic frame.

Figure 6:
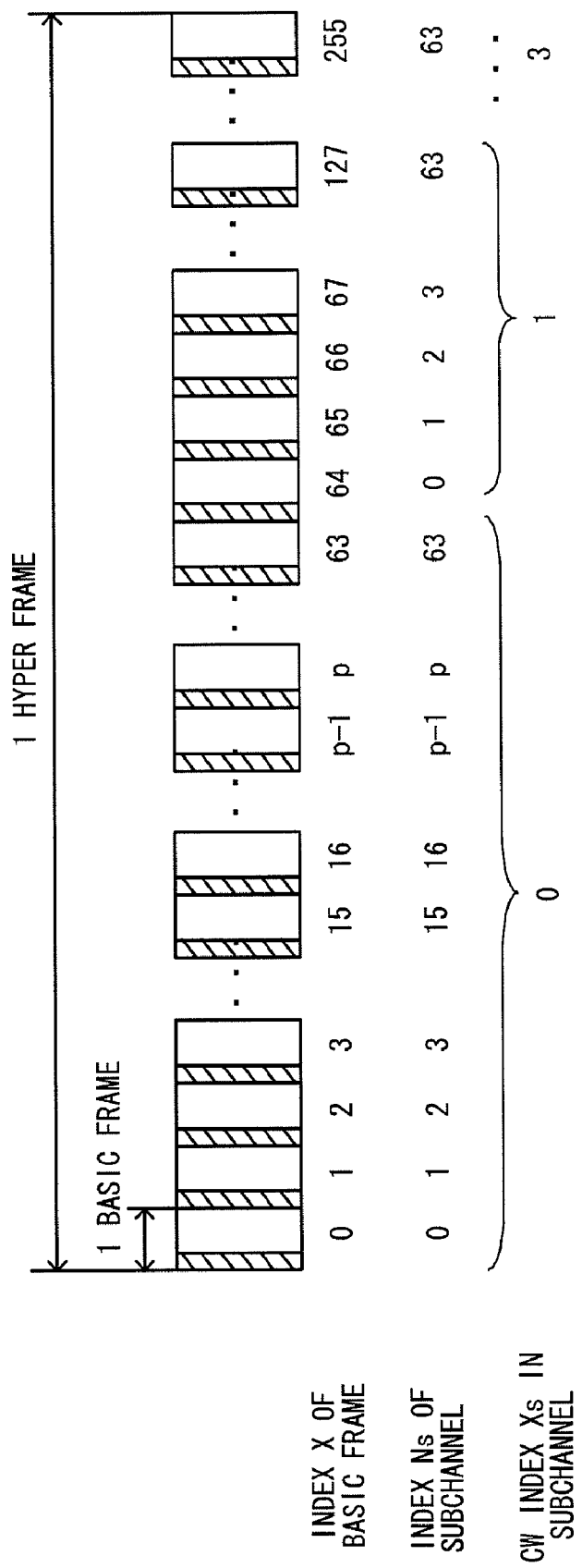
FIG. 6 is a diagram illustrating the details of a hyper frame.

FIG. 6 is a diagram illustrating the details of the hyper frame. One hyper frame is illustrated in FIG. 6. As described above, one hyper frame has 256 basic frames of X0 to X255. The hatched portion of the basic frame illustrated in FIG. 6 represents a control word.

The 256 basic frames are assembled into 64 subchannels as illustrated in FIG. 6. Indexes Ns of 0 to 63 are allocated to the basic frames of the respective subchannels as illustrated in FIG. 6, and indexes Xs of 0 to 3 are allocated to the control words in the respective subchannels.

The control words in one hyper frame serve as a header by assembling the 256 basic frames into 64 subchannels.

FIG. 7 is a diagram illustrating the mapping of the control words. As illustrated in FIG. 7, the control words serve as a header by assembling the basic frames in one hyper frame into 64 subchannels. Xs of FIG. 7 correspond to Xs of FIG. 6, and the subchannels of FIG. 7 correspond to Ns of FIG. 6. The control words have a predetermining meaning by mapping the control words as illustrated in FIG. 7.

Now, how to exchange communication information to enable the recognition of the cascade connection and the Ethernet communication between REC-REs through CPRI or the HDLC communication will be described. First, the recognition of the cascade connection will be described.

Figure 8:
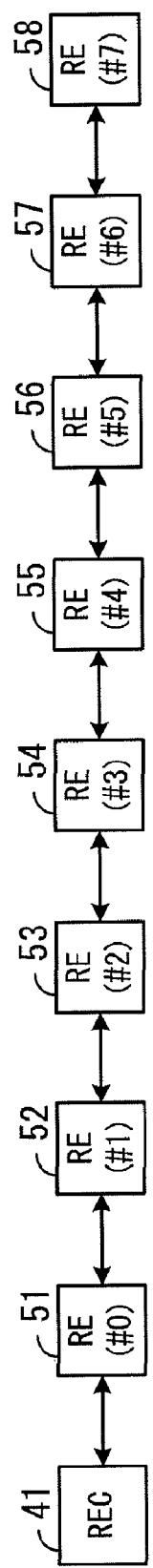
FIG. 8 is a diagram illustrating REC and cascade-connected REs.

FIG. 8 is a diagram illustrating REC and cascade-connected REs. As illustrated in FIG. 8, RE 51 to RE 58 are cascade-connected to REC 41. REC 41 of FIG. 8 corresponds to REC 11 of FIG. 2, and RE 51 to RE 58 of FIG. 8 correspond to REs 21a, 22a, . . . , of FIG. 2. It is noted that #0 to #7 of FIG. 8 represent the names of RE 51 to RE 58.

REC 41 and REs 51 to 58 (hereinafter REs 51 to 58 may be referred as REs) need communication information such as IP addresses or the like so as to carry out the Ethernet communication or HDLC communication (the C&M plane communication in the Ethernet area or the HDLC area described with reference to FIG. 4) based on CPRI. REC 41 needs to recognize the number of cascade-connected REs to transmit communication information to each RE. In order to receive communication information, RE needs to recognize the position in the cascade connection at which the RE concerned is cascade-connected.

Figure 9:
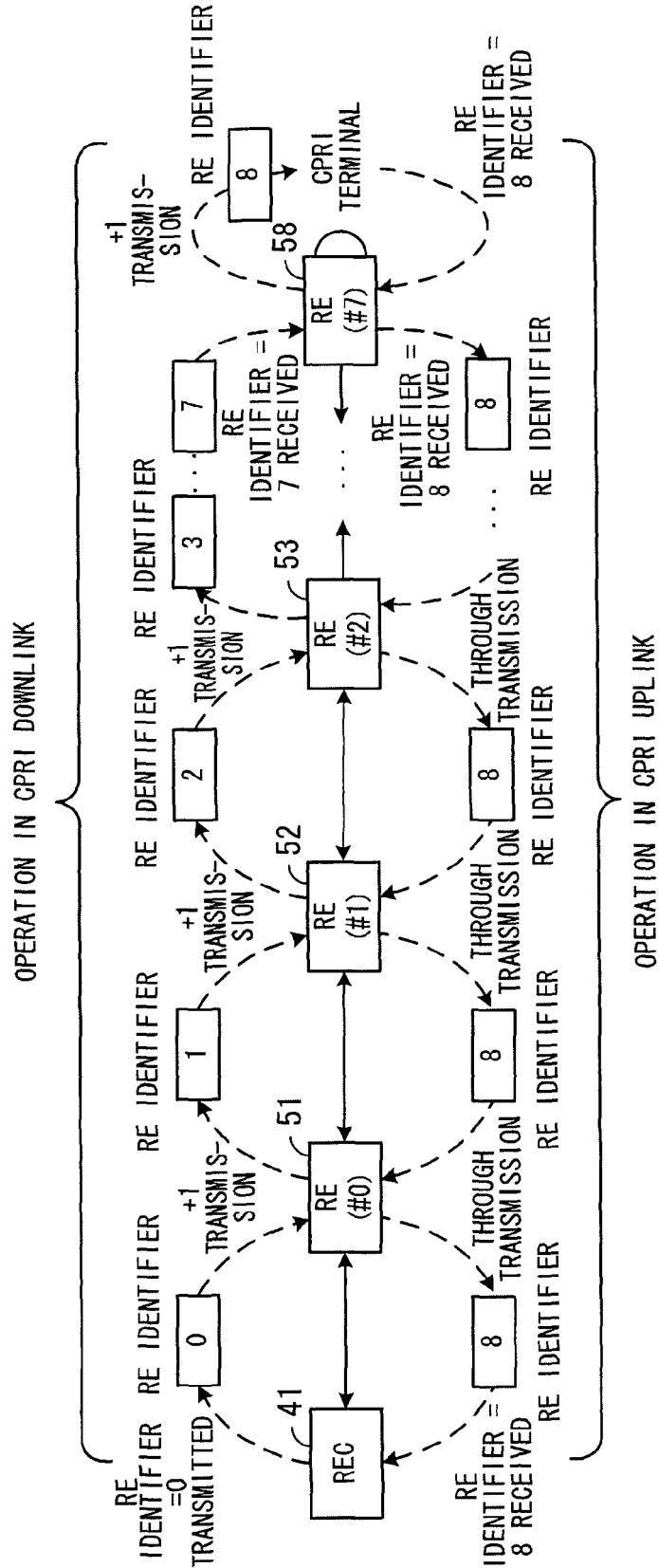
FIG. 9 is a diagram illustrating the processing of recognizing a connection style (connecting relationship)

FIG. 9 is a diagram illustrating the recognition processing of the connection relation. In FIG. 9, the same elements as FIG. 8 are represented by the same reference numerals, and the description thereof is omitted. In FIG. 9, the direction from REC 41 to RE 58 at the last stage of the cascade connection is called "downlink", and the inverse direction is called "uplink".

REC 41 transmits an RE identifier for recognizing the connection relations of respective REs to RE 51, which is immediately connected to REC 41.

Each of REs 51 to 58 adds "1" to the RE identifier transmitted from the adjacent uplink RE and transmits the RE identifier concerned to the downlink RE. Accordingly, on the basis of the received RE identifier, each of REs 51 to 58 can recognize at which stage of the cascade connection from REC 41 it is connected.

RE is not connected in the downlink of RE 58 at the last stage. CPRI of RE 58 at the last stage is terminated so that RE 58 adds "1" to the received RE identifier and then returns the RE identifier to the uplink RE 57.

Each of REs 51 to 58 compares the RE identifier which is received in the downlink direction with the RE identifier which it received in the uplink direction. RE 51 to 58 directly transmit the RE identifier having a larger value to RE 51 to 58 at the next stage.

Normally, the relationship of identifier in the uplink direction>identifier in the downlink direction is satisfied, and in the uplink direction, RE 51 to 58 receive and transmit the RE identifier from RE 58 at the last stage as it is.

Accordingly, REC 41 and REs 51 to 58 can recognize how many REs are cascade-connected.

For example, in FIG. 9, REC 41 transmits an RE identifier of "0" to RE 51. RE 51 receives the RE identifier of "0" and thus can recognize that it is located at the first stage of the cascade connection. RE 51 adds "1" to the received RE identifier of "0", and then transmits the RE identifier to RE 52.

RE 52 receives the RE identifier of "1". On the basis of the RE identifier of "1", RE 52 itself can recognize that it is connected at the second stage of the cascade connection. RE 52 adds "1" to the received RE identifier and then transmits the RE identifier to RE 53.

REs 53 to 58 execute the same processing as described above. Accordingly, REs 53 to 57 receive the RE identifiers of "2", "3", "4", "5", "6" and "7", respectively, and can recognize at which stages they are cascade-connected.

RE 58 is located at the last stage in the cascade connection, and thus it executes a terminating processing. RE 58 adds "1" to the received identifier of "7", and transmits the identifier "8" in the uplink.

RE 57 compares the RE identifier "6" which it received in the downlink (the downlink RE identifier) with the RE identifier of "8" which it received in the uplink (the uplink RE identifier) from RE 58. The uplink RE identifier is larger than the downlink RE identifier, and thus RE 57 directly transmits the uplink RE identifier of "8" to RE 56.

Each of REs 56 to 51 judges the uplink RE identifier>the downlink RE identifier, and thus directly transmits the uplink RE identifier to the uplink RE.

REs 58 to 51 and REC 41 receive the uplink RE identifier of "8". Accordingly, REC 41 and REs 57 to 51 can recognize that eight REs are cascade-connected to one another.

FIG. 10 is a diagram illustrating the mapping of the RE identifier, and a part of the control word mapping described with reference to FIG. 7 is illustrated in FIG. 10.

The vendor specific area of the CPRI frame is an area which a user can freely use. Accordingly, REC41-REs transmit the CPRI frame while the RE identifier is stored in the vendor specific area of the CPRI frame. For example, as illustrated in FIG. 10, the CPRI frame is transmitted/received while the RE identifier is stored in the vendor specific area of the index Xs=1 and the subchannel 16.

Next, the transmission/reception of the communication information will be described. After the cascade connection relation of REs 51 to 58 are recognized, REC 41 is required to transmit communication information to REs 51 to 58 so as to carry out the Ethernet communication or HDLC communication based on CPRI between REC 41 and REs. Furthermore, REs 51 to 58 are also required to receive the communication information transmitted from REC 41.

FIG. 11 is a diagram illustrating the mapping of the communication information. FIG. 11 illustrates a part of the control word mapping described with reference to FIG. 7.

REC 41 and each of REs 51 to 58 can recognize through the recognition processing of the cascade connection what number of REs are cascade-connected to one another and also at which position each RE is cascade-connected. Accordingly, REC 41 can recognize a vendor specific area in which the communication information addressed to each RE is to be stored. Furthermore, each of REs 51 to 58 can recognize a vendor specific area in which the communication information addressed thereto is stored.

For example, as illustrated in FIG. 11, REC 41 and REs 51 to 58 transmit/receive communication information by using the vendor specific areas of indexes Xs=0 to 3 and subchannels 17 to 24. REC 41 can recognize through the cascade connection recognition processing that eight REs 51 to 58 are cascade-connected, and thus recognize that the communication information addressed to REs 51 to 58 is to be stored in the respective vendor specific areas of the subchannels 17 to 24. Furthermore, each of REs 51 to 58 recognizes at which position it is cascade-connected, and thus can recognize which one of the vendor specific areas of the subchannels 17 to 24 is the area in which the communication information addressed to the RE concerned is stored.

Figure 12:
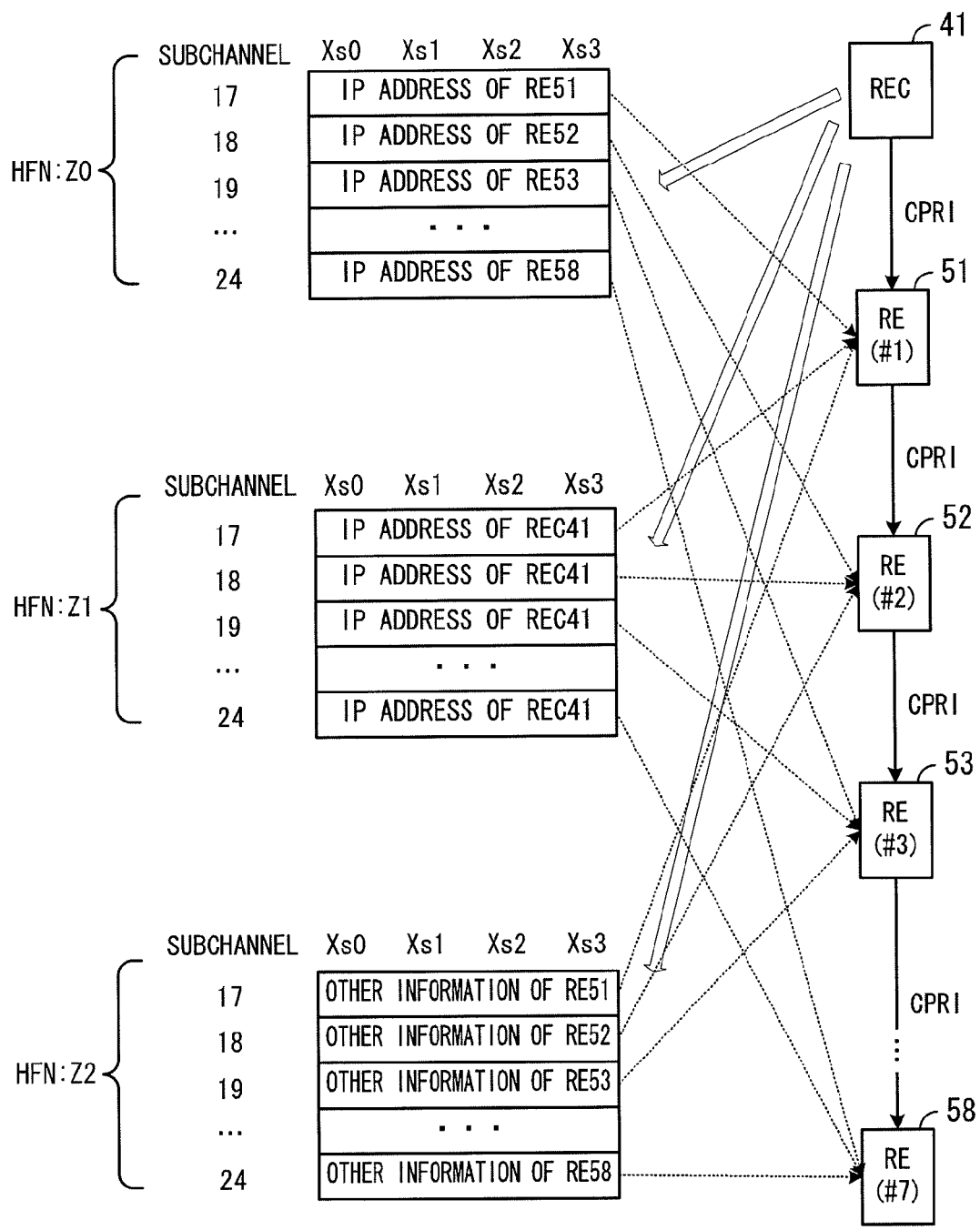
FIG. 12 is a diagram illustrating transmission/reception of communication information.

FIG. 12 is a diagram illustrating the transmission/reception of the communication information. FIG. 12 illustrates REC 41 and REs 51 to 58 described with reference to FIG. 8.

REC 41 transmits to REs 51 to 58 communication information which is different in attribute among hyper frames. For example, as illustrated in FIG. 12, in the hyper frame (HFN in FIG. 12) Z0, the communication information of IP addresses of REs 51 to 58 is transmitted to REs 51 to 58. In the hyper frame Z1, the communication information of the IP address of REC 41 is transmitted to REs 51 to 58. In the hyper frame Z2, the communication information containing other information is transmitted to REs 51 to 58.

With respect to the hyper frame Z0, REC 41 stores the IP addresses of REs 51 to 58 into the vendor specific areas of the indexes Xs=0 to 3 and the subchannels 17 to 24 and transmits them. Each of REs 51 to 58 can recognize in which vendor specific area the IP address addressed thereto is stored. For example, RE 51 can obtain the IP address addressed to the RE 51 by referring to the subchannel 17 of the hyper frame Z0. RE 52 can obtain the IP address addressed thereto by referring to the subchannel 18 of the hyper frame Z0. Likewise, RE 58 can obtain the IP address addressed thereto by referring to the subchannel 24 of the hyper frame Z0.

With respect to the hyper frame Z1, REC 41 stores the IP address of REC 41 into the vendor specific areas of the indexes Xs=0 to 3 and the subchannels 17 to 24 and transmits them. Each of REs 51 to 58 can obtain the IP address of REC 41 by referring to the vendor specific area addressed thereto. For example, RE 51 can obtain the IP address of REC 41 by referring to the subchannel 17 of the hyper frame Z1. REC 52 can obtain the IP address of REC 41 by referring to the subchannel 18 of the hyper frame Z1. Likewise, RE 58 can obtain the IP address of REC 41 by referring to the subchannel 24 of the hyper frame Z1.

With respect to the hyper frame Z2, REC 41 stores other information addressed to REs 51 to 58 into the vendor specific areas of the indexes Xs=0 to 3 and the subchannels 17 to 24 and transmits them. Each of REs 51 to 58 can recognize in which vendor specific area the other information addressed thereto is stored. For example, RE 51 can obtain the other information addressed thereto by referring to the subchannel 17 of the hyper frame Z2. RE 52 can obtain the other information addressed thereto by referring to the subchannel 18 of the hyper frame Z2. Likewise, RE 58 can obtain the other information addressed thereto by referring to the subchannel 24 of the hyper frame Z2.

REC 41 and REs can communicate with each other by using the transmitted/received notification information. For example, REC 41 can transmit data to REs 51 to 58 by using the IP addresses of REs 51 to 58, respectively. REs can transmit data to REC 41 by using the IP address of REC 41. The data communication using the IP addresses is executed in the Ethernet area or HDLC area of the CPRI frame.

The blocks of REC 41 and REs 51 to 58 and the processing flow will be described.

Figure 13:
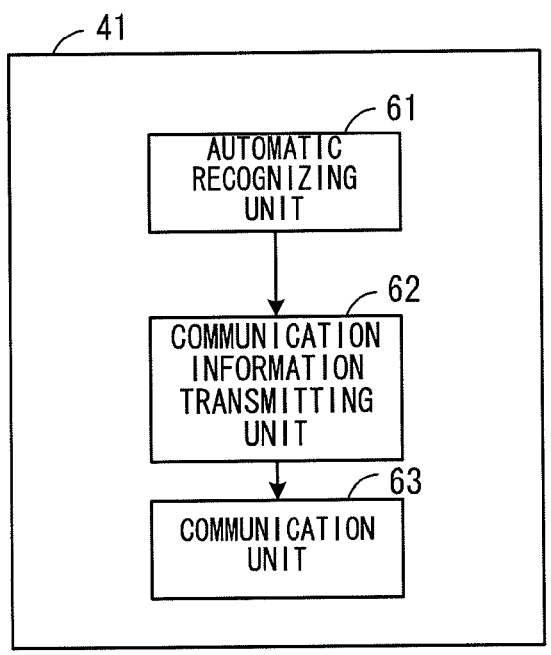
FIG. 13 is a block diagram of REC.

FIG. 13 is a block diagram of REC. As illustrated in FIG. 13, REC 41 has a recognizing unit 61, a communication information transmitting unit 62 and a communication unit 63.

The recognizing unit 61 transmits an RE identifier to RE 51 connected to REC 41. For example, the RE identifier of "0" is transmitted. The recognizing unit 61 periodically transmits the RE identifier. The recognizing unit 61 recognizes the number of cascade-connected REs 51 to 58 by the uplink RE identifier returned from RE 51.

The communication information transmitting unit 62 transmits communication information to be used to communicate between REC 41 and REs. The communication information contains the IP address of REs 51 to 58, the IP address of REC 41 and other communication information required for communications. The communication information transmitting unit 62 transmits the communication information by using the vendor specific area of the CPRI frame.

The communicating unit 63 communicates with REs 51 to 58 by using the communication information transmitted by the communication information transmitting unit 62. For example, the communication unit 63 indicates the IP address of any of RE 51 to 58 to be communicated, and executes the communication by using the Ethernet area or HDLC area of the CPRI frame.

Figure 14:
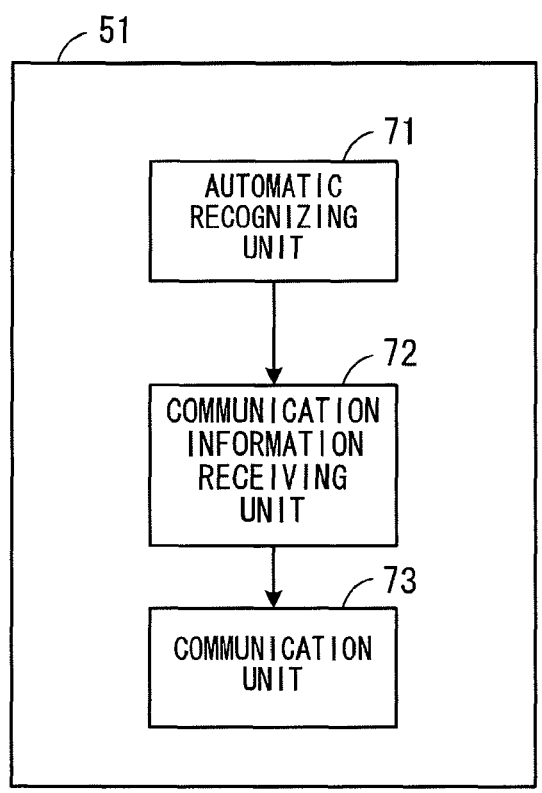
FIG. 14 is a block diagram of RE.

FIG. 14 is a block diagram of RE. As illustrated in FIG. 14, RE 51 has a recognizing unit 71, a communication information receiving unit 72 and a communication unit 73. REs 52 to 58 have the same features as RE 51, and the description thereof is omitted.

The recognizing unit 71 receives the downlink RE identifier. The recognizing unit 71 stores the received RE identifier into a storage device, such as a memory or the like. The recognizing unit 71 adds "1" to the received downlink RE identifier, and transmits the RE identifier concerned to the downlink RE 52.

When receiving the uplink RE identifier, the recognizing unit 71 compares the uplink RE identifier with the downlink RE identifier stored in the storage device. If the uplink RE identifier>the downlink RE identifier, the received RE identifier is directly transmitted to uplink RE (REC 41).

When RE 51 is the terminal of the cascade connection (e.g., RE 58 in FIG. 8), the recognizing unit 71 adds "1" to the received RE identifier, and returns the RE identifier concerned to the uplink RE. That is, the recognizing unit 71 executes the termination processing when RE 51 is located at the last stage of the cascade connection.

The communication information receiving unit 72 receives the communication information addressed thereto from the vendor specific area of the CPRI frame.

The communication unit 73 communicates with REC 41 by using the communication information received by the communication information receiving unit 72. For example, the communication unit 73 indicates the IP address of REC 41 and communicates with REC 41 by using the Ethernet area or HDLC area of the CPRI frame.

Figure 15:
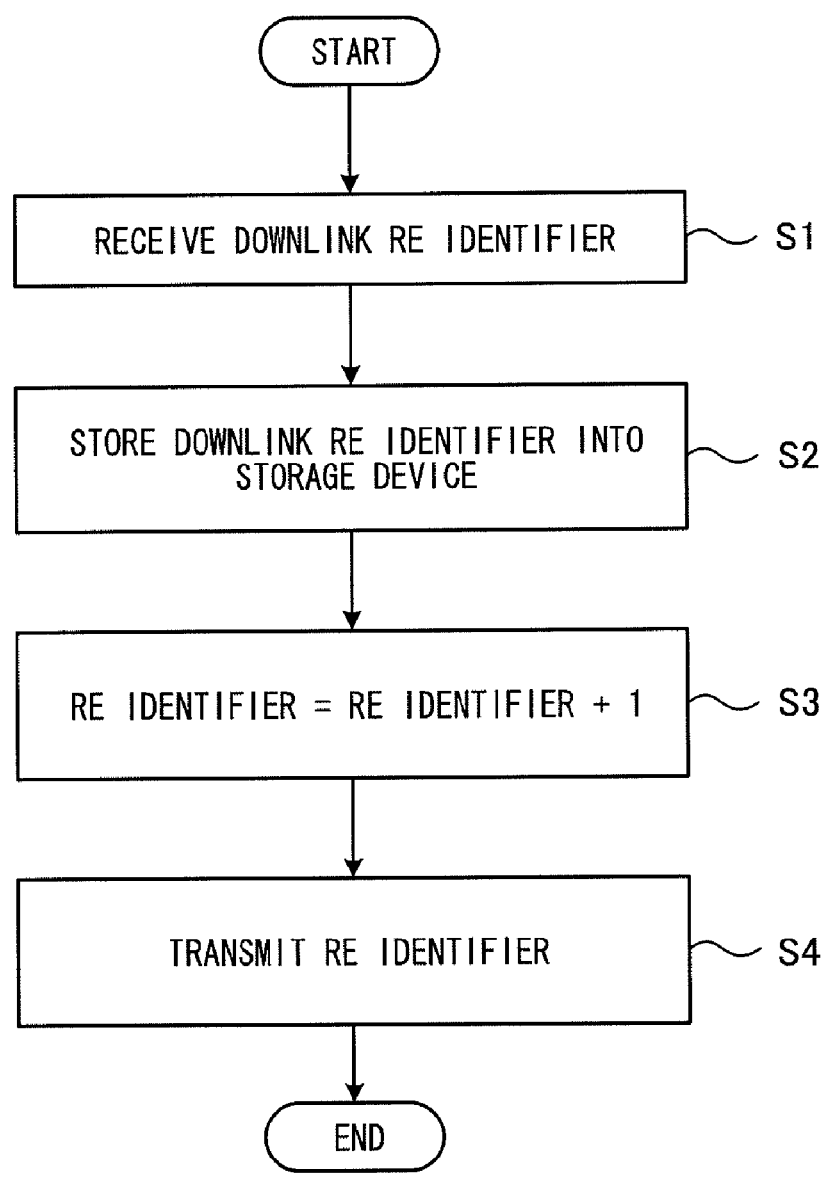
FIG. 15 is a flowchart illustrating downlink processing of the RE identifier of RE.

FIG. 15 is a flowchart illustrating the downlink processing of the RE identifier of RE. FIG. 15 illustrates the processing flow of RE 51, however, the processing flows of REs 52 to 58 are the same as the processing flow of RE 51.

In step S1, RE 51 receives a downlink RE identifier.

In step S2, RE 51 stores the downlink RE identifier into the storage device. That is, RE 51 stores the received RE identifier as a self RE identifier to recognize the position thereof in the cascade connection arrangement.

In step S3, RE 51 adds "1" to the received RE identifier.

In step S4, RE 51 transmits the RE identifier added with "1" to the downlink RE 52. RE 51 transmits the RE identifier added with "1" to the uplink direction when the RE 51 concerned is located at the last stage of the cascade connection.

Figure 16:
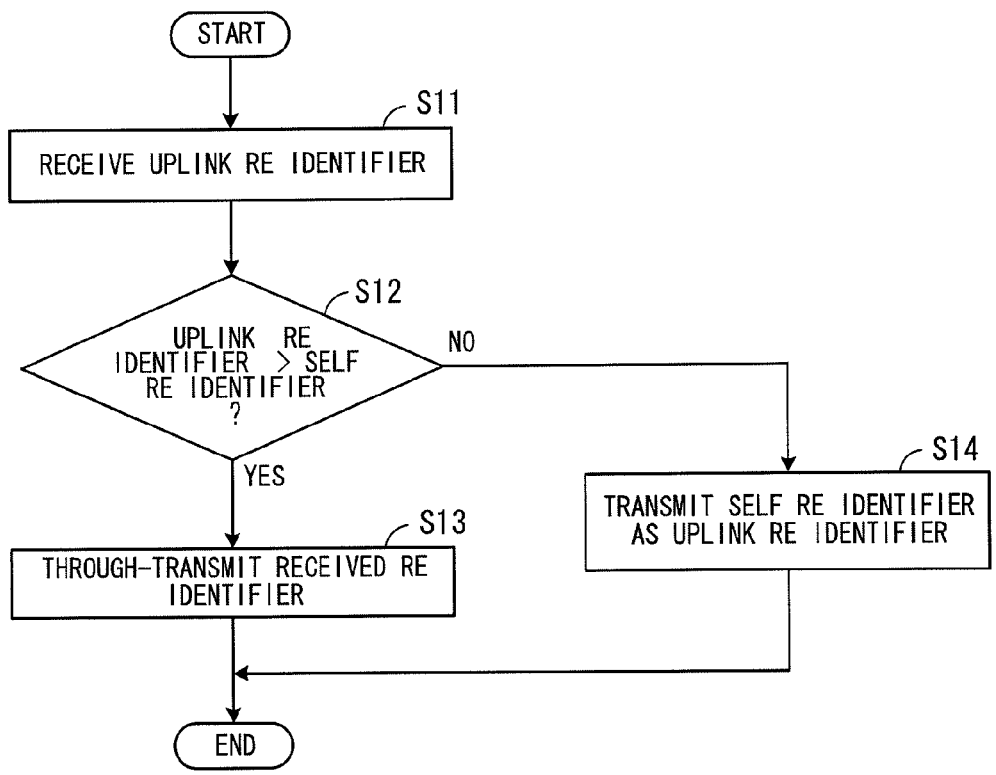
FIG. 16 is a flowchart illustrating uplink processing of the RE identifier of RE.

FIG. 16 is a flowchart illustrating the uplink processing of the RE identifier of RE. FIG. 16 illustrates the processing flow of RE 51, and REs 52 to 58 have the same processing flow.

In step S11, RE 51 receives the uplink RE identifier.

In step S12, RE 51 compares the received uplink RE identifier with the self RE identifier stored in the storage device. When the uplink RE identifier is larger than the self RE identifier, the processing goes to step S13. When the uplink RE identifier is equal to or smaller than the self RE identifier, the processing goes to step S14.

In step S13, RE 51 through-transmits the received uplink RE identifier. That is, RE 51 transmits the received uplink RE identifier to the uplink REC 41 (or the uplink RE) as it is.

In step S14, RE 51 transmits the self RE identifier stored in the storage device as the uplink RE identifier.

If each RE is normal, the determination processing of step S12 goes to step S13. On the other hand, when some abnormality occurs in REs and variation occurs in the uplink RE identifier, the processing goes to step S14. When the processing goes to step S14, RE which is estimated to have some abnormality becomes not to be recognized in the cascade connection arrangement, and communications are performed among normal REs.

Figure 17:
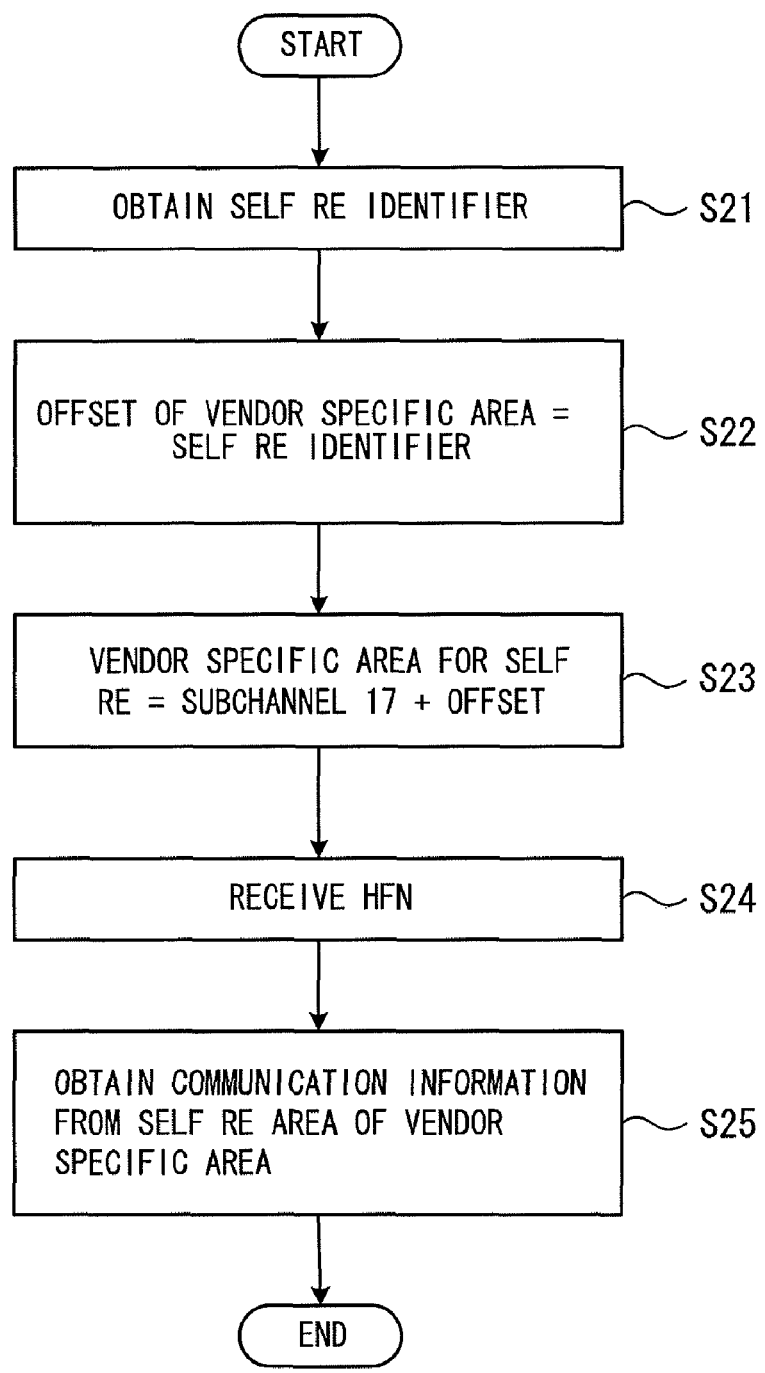
FIG. 17 is a flowchart illustrating the reception processing of communication information of RE.

FIG. 17 is a flowchart illustrating the REs' reception processing of the communication information. FIG. 17 illustrates the processing flow of RE 51, however, REs 52 to 58 have the same processing flow.

In step S21, RE 51 obtains the self RE identifier stored in the storage device.

In step S22, RE 51 substitutes the self RE identifier obtained in step S21 into a variable offset.

In step S23, RE 51 adds the offset of step S22 to "17" of the subchannel, and substitutes the addition result into the vendor specific area for the variable self RE.

As illustrated in FIG. 8, RE 51 is connected at the first stage of the cascade connection, and thus the RE identifier of "0" is stored in the storage device thereof. Accordingly, in the case of RE 51, the vendor specific area for self RE is set to 17+0=17. Accordingly, the vendor specific area for self RE indicates the "area for RE 51" illustrated in FIG. 11.

In the case of RE 53, it is cascade-connected at the third stage of the cascade connection, and thus the RE identifier of "2" is stored in the storage device thereof. Accordingly, in the case of RE 53, the self RE vendor specific area is set to 17+2=19. Accordingly, the self RE vendor specific area indicates the "area for RE 53" illustrated in FIG. 11.

In step S24, RE 51 receives a hyper frame.

In step S25, RE 51 obtains the communication information addressed thereto from the area for self RE.

For example, when receiving the hyper frame Z0, RE 51 obtains the communication information of "IP address of RE 51" indicated by the self RE vendor specific area as illustrated in FIG. 12. When receiving the hyper frame Z1, RE 51 obtains the communication information of "IP address of REC 41" indicated by the self RE vendor specific area. When receiving the hyper frame Z2, RE 51 obtains "the other communication information of RE 51" indicated by the self RE vendor specific area.

As described above, REs 51 to 58 receive the communication information.

FIGS. 18 and 19 are sequence diagrams of the recognition processing of REC and REs. FIGS. 18 and 19 illustrate the recognition processing sequence of REC 41 and REs 51 to 58 illustrated in FIG. 8. The recognition processing continues in FIGS. 18 and 19.

In step S31, REC 41 transmits the RE identifier of "0" to the downlink RE 51.

In step S32, RE 51 receives the RE identifier of "0" from REC 41. RE 51 stores the received RE identifier of "0" as the self RE identifier (self RE in FIGS. 18 and 19) into the storage device. Furthermore, RE 51 adds "1" to the received RE identifier of "0" (RE in FIGS. 18 and 19).

In step S33, RE 51 transmits the RE identifier of "1" to the downlink RE 52.

In step S34, RE 52 receives the RE identifier of "1" from RE 51. RE 52 stores the received RE identifier of "1" as the self RE identifier into the storage device. Furthermore, RE 52 adds "1" to the received RE identifier of "1".

In step S35, RE 52 transmits the RE identifier of "2" to the downlink RE 53.

The processing from step S36 to S45 are the same as described above, and the description thereof is omitted.

In step S46, RE 58 receives the RE identifier of "7" from RE 57. RE 58 stores the received RE identifier of "7" as the self RE identifier into the storage device. Furthermore, RE 58 adds "1" to the received RE identifier of "7".

In step S47, as RE 58 is connected at the last stage of the cascade connection, it executes the termination processing. RE 58 compares the RE identifier of "8" with the RE identifier of "7" stored in the storage device.

In step S48, RE 58 transmits the RE identifier of "8" to the uplink RE 57 as it is because the RE identifier of "8" is larger than the self RE identifier of "7".

In step S49, RE 57 receives the RE identifier of "8" from RE 58. RE 57 compares the received RE identifier of "8" with the self RE identifier of "6" stored in the storage device.

In step S50, RE 57 transmits the RE identifier of "8" to the uplink RE 56 as it is because the RE identifier of "8" is larger than the self RE identifier of "6".

The processing from step S51 to step S62 are the same as described above, and thus the description thereof is omitted.

Through the above sequence, each of REs 51 to 58 can recognize on the basis of the self RE identifier stored in the storage device thereof at which position of the cascade connection it is cascade-connected. Furthermore, REC 41 and REs 51 to 58 receive the uplink RE identifier of "8", whereby they can recognize the number of cascade-connected REs.

FIGS. 20 and 21 are sequence diagrams of the communication information processing of REC and REs. FIGS. 20 and 21 illustrate the sequence of the communication information processing of REC 41 and REs 51 to 58 illustrated in FIG. 8. The communication information processing continues in FIGS. 20 and 21.

In step S71, RE 51 obtains the self RE identifier stored in the storage device. RE 51 substitutes the obtained self RE identifier into the variable offset. The self RE identifier of RE 51 is equal to "0", and thus "0" is stored in the offset.

RE 51 adds "17" to the offset "0", and stores the value into the vendor specific area for the variable self RE (the area indication in FIGS. 11 and 12). As the offset is "0", the area indication is set to "17". Accordingly, RE 51 can recognize the vendor specific area for RE 51 illustrated in FIG. 11.

RE 51 executes the processing of step S71 after the processing of step S33 of FIG. 18.

In step S72, RE 52 obtains the self RE identifier stored in the storage device. RE 52 substitutes the obtained self RE identifier into the offset. The self RE identifier of RE 52 is equal to "1", and thus "1" is stored in the offset.

RE 52 adds "17" to the offset "1", and stores the value into the area indication. The offset is equal to "1", and thus the area indication is set to "18". Accordingly, RE 52 can recognize the vendor specific area for RE 52 illustrated in FIG. 11.

RE 52 executes the processing of step S72 after the processing of step S35 of FIG. 18. The processing from step S73 to S78 is the same as described above, and the description thereof is omitted.

In step S79, REC 41 transmits the hyper frame Z0 in FIG. 21).

In step S80, RE 51 refers to the vendor specific area of the hyper frame Z0 by using the area indication "17" calculated in step S71 of FIG. 20, and obtains the IP address addressed thereto from the vendor specific area for RE 51.

In step S81, RE 52 refers to the vendor specific area of the hyper frame Z0 by using the area indication "18" calculated in step S72 of FIG. 20, and obtains the IP address addressed thereto from the vendor specific area for RE 52.

The processing from step S82 to step S87 is the same as described above, and the description thereof is omitted.

In step S88, REC 41 transmits the hyper frame Z1.

In step S89, RE 51 refers to the vendor specific area of the hyper frame Z1 by using the area indication "17" calculated in step S71 of FIG. 20, and obtains the IP address of REC 41 from the vendor specific area for RE 51.

In step S90, RE 52 refers to the vendor specific area of the hyper frame Z1 by using the area indication "18" calculated in step S72 of FIG. 20, and obtains the IP address of REC 41 from the vendor specific for RE 52.

The processing from step S91 to step S96 is the same as described above, and the description thereof is omitted.

In step S97, REC 41 transmits the hyper frame Z2.

In step S98, RE 51 refers to the vendor specific area of the hyper frame Z2 by using the area indication "17" calculated in step S71 of FIG. 20, and obtains other information addressed to RE 51 from the vendor specific area for RE 51.

In step S99, RE 52 refers to the vendor specific area of the hyper frame Z2 by using the area indication "18" calculated in step S72 of FIG. 20, and obtains other information addressed thereto from the vendor specific area for RE 52.

The processing from step S100 to step s105 is the same as described above, and the description thereof is omitted.

REC 41 can transmit predetermined communication information to REs 51 to 58 with respect to hyper frames subsequent to the hyper frame Z3. When transmitting a hyper frame Z149, REC 41 transmits the hyper frames from the hyper frame Z0 again. Then, the same processing as the processing from step S79 to S105 is executed.

Accordingly, REC 41 and REs 51 to 58 can perform communication using the Ethernet area or HDLC area of the CPRI frame by mutually indicating the IP addresses.

As described above, REC and REs can recognize the connection relation of the cascade connection on the basis of the RE identifiers. Even when any RE is deleted from or added to the cascade connection, its connection relation in the cascade connection can be recognized. Furthermore, by recognizing the connection relation in the cascade connection, REC and REs can transmit/receive the IP addresses, etc. required for the CPRI communication between REC and REs, and perform the communication using the Ethernet area or HDLC area of CPRI.

REC and REs can be connected through CPRI without using any special link, and thus no separate interface, such as Ethernet or the like, for transmitting radio data and control data is necessary.

Furthermore, by transmitting communication information whose attribute is different for every hyper frame, various information can be received/transmitted.

Furthermore, REs 51 to 58 can recognize the IP addresses of the other REs 51 to 58 by referring to the areas of the other REs 51 to 58 illustrated in FIG. 11, and REs 51 to 58 can communicate with one another.

According to the device and the system as described above, as the connection relation in the cascade connection can be recognized on the basis of the identifiers inserted in the frames, radio equipment can be newly added to or deleted from the cascade connection with ease.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustration of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. A radio equipment control for communicating with plural radio equipment units, comprising:
   an identifier inserting unit for inserting into a frame an identifier for recognizing a connection relation of the plural radio equipment units, which are cascade-connected;
   a transmitting unit for transmitting the frame having the identifier inserted therein by the identifier inserting unit to the plural cascade-connected radio equipment units;
   a receiving unit for receiving the frame having the identifier inserted therein from the plural cascade-connected radio equipment units; and
   a connection relation recognizing unit for recognizing the connection relation of the plural cascade-connected radio equipment units on the basis of the identifier of the frame received by the receiving unit.

2. The radio equipment control according to claim 1, wherein the frame is a Common Public Radio Interface (CPRI) frame.

3. The radio equipment control according to claim 2, wherein the identifier inserting unit periodically inserts the identifier into the CPRI frame.

4. The radio equipment control according to claim 2, wherein the identifier inserting unit inserts the identifier into a predetermined area of the CPRI frame.

5. The radio equipment control according to claim 2, further comprising a communication information transmitting unit for transmitting communication information for executing Ethernet communication or HDLC communication based on CPRI to each of the plural radio equipment units on the basis of the connection relation recognized by the connection relation recognizing unit.

6. The radio equipment control according to claim 5, wherein the communication information transmitting unit inserts the communication information into a predetermined area of the CPRI frame.

7. The radio equipment control according to claim 5, wherein the communication information is different in information attribute for every hyper frame.

8. The radio equipment control according to claim 5, wherein the communication information contains IP addresses of the radio equipment control and the plural radio equipment units.

9. A radio equipment unit for communicating with a radio equipment control, comprising:
   a receiving unit for receiving a frame having an identifier inserted therein from the radio equipment control or another uplink radio equipment unit;
   a connection relation recognizing unit for recognizing a connection relation of the radio equipment unit with plural cascade-connected radio equipment units on the basis of the identifier of the frame received by the receiving unit;
   a transmitting unit for executing a predetermined operation on the frame received by the receiving unit and transmitting the frame concerned to another cascade-connected downlink radio equipment unit; and
   a transmitting/receiving unit for receiving an uplink frame from the downlink radio equipment unit, and transmitting the frame concerned to the uplink radio equipment unit or the radio equipment control.

10. The radio equipment unit according to claim 9, wherein the frame is a Common Public Radio Interface (CPRI) frame.

11. The radio equipment unit according to claim 10, wherein the transmitting unit adds a predetermined value to the identifier of the CPRI frame, and transmits the CPRI frame concerned to the downlink radio equipment unit.

12. The radio equipment unit according to claim 10, further comprising a communication information obtaining unit for obtaining communication information for executing Ethernet communication or HDLC communication based on CPRI from a predetermined area of the CPRI frame.

13. The radio equipment unit according to claim 12, wherein the communication information contains IP addresses of the radio equipment unit and the radio equipment control.

14. The radio equipment unit according to claim 10, wherein the transmitting unit transmits the CPRI frame received by the receiving unit to the uplink radio equipment unit when the radio equipment unit concerned is connected at the last stage of the cascade connection.

15. A radio communication system comprising:
   a radio equipment control including an identifier inserting unit for inserting into a frame an identifier for recognizing a connection relation of plural cascade-connected radio equipment units, a transmitting unit for transmitting the frame having the identifier inserted therein by the identifier inserting unit to the plural cascade-connected radio equipment units, a receiving unit for receiving the frame having the identifier inserted therein from the plural cascade-connected radio equipment units, and a connection relation recognizing unit for recognizing the connection relation of the plural cascade-connected radio equipment units on the basis of the identifier of the frame received by the receiving unit; and the radio equipment units each including a receiving unit for receiving a frame having an identifier inserted therein from the radio equipment control or another uplink radio equipment unit, a connection relation recognizing unit for recognizing a connection relation of the radio equipment unit in the plural cascade-connected radio equipment units on the basis of the identifier of the frame received by the receiving unit, a transmitting unit for executing a predetermined operation on the frame received by the receiving unit and transmitting the frame concerned to another cascade-connected downlink radio equipment unit, and a transmitting/receiving unit for receiving an uplink frame from the downlink radio equipment unit, and transmitting the frame concerned to the uplink radio equipment unit or the radio equipment control.

* * * * *